United States Patent [19]

Hyatt et al.

[11] Patent Number: 4,674,141
[45] Date of Patent: Jun. 23, 1987

[54] BRACKET AND BED FORMED THEREFORM

[76] Inventors: Michael Hyatt, 5826 Hiawatha Rd.; Mark James, 105 Diane Ave., both of Morristown, Tenn. 37814

[21] Appl. No.: 727,741

[22] Filed: Apr. 26, 1985

[51] Int. Cl.$^4$ .......................................... A47C 19/02
[52] U.S. Cl. .......................................... 5/132; 5/288; 403/247; 403/260
[58] Field of Search ............... 5/282 R, 288, 292, 293, 5/131, 132, 287, 289, 303, 304, 53 R; 403/260, 247

[56] References Cited

U.S. PATENT DOCUMENTS

| 407,208 | 7/1889 | Hopkins | 5/132 |
| 608,546 | 8/1898 | Coburn | 5/131 |

Primary Examiner—Alexander Grosz

[57] ABSTRACT

A bracket for attaching a side rail to a headboard and a footboard to form a bed having an L-shaped body portion with a side section and an end section, means releasably securing the side section to the side rail, threaded means within the body portion end section to cooperatively receive screw means extending through at least the headboard to hold at least the headboard securely against the body portion end section and the side rail end portion.

8 Claims, 3 Drawing Figures

BRACKET AND BED FORMED THEREFORM

BACKGROUND, OBJECTIVES, AND BRIEF SUMMARY OF THE INVENTION

The present invention relates to beds and more particularly to brackets for connecting head and footboards to bed side rails.

While beds historically have been constructed in varied sturdy configurations, there is a tendency for the connections between headboards and footboards with side rails to loosen, particularly when the beds continue to be used over a long period of time. The bed user's tossing and turning have a tendency to loosen the connections between these components, even though in many instances several bolts or other latching devices are used to strengthen them.

The present invention was developed to resist the tendency for these connections to loosen by providing a bracket encompassing or enveloping the end and side of the bed rail and containing threaded apertures in its end section to threadably receive a screw extending through the headboard or footboard in a rigid manner.

Another object of the present invention is to provide an improved bracket for connecting headboards and footboards to side rails that may be manufactured at a reasonable cost and utilized to provide a bed that will have a sturdy, long and reliable life.

A further object of the present invention is to provide an improved knockdown bed.

These and other objects of the present invention will become more readily apparent after consideration of the following detailed description taken in conjunction with the accompanying drawings wherein like characters of reference represent like parts throughout the several viewed.

FIGURE DESCRIPTION

DETAILED DESCRIPTION OF THE DISCLOSURE

Figure 1:
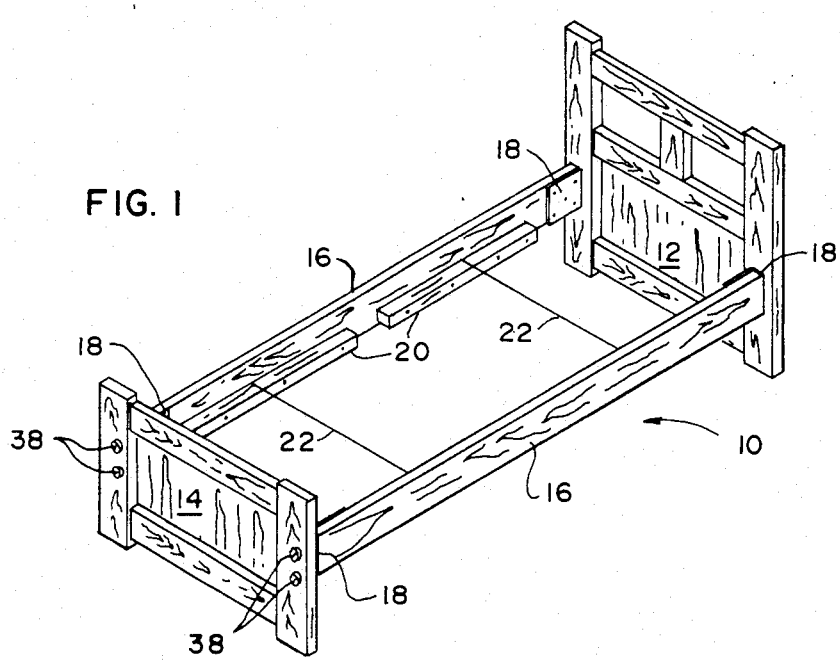
FIG. 1 is a perspective view of the assembled bed utilizing the bracket of the present invention.

Referring now to the drawings and particularly to FIG. 1, there is shown generally a bed 10 having a headboard 12, a footboard 14 and side rails 16, the headboard and footboard connecting to the ends 18 of each side rail 16. Side rails 16 are of standard construction having flanges or ledges 20 affixed to their inner surfaces to support additional braces 22 on which rest springs and mattress (not shown).

Figure 2:
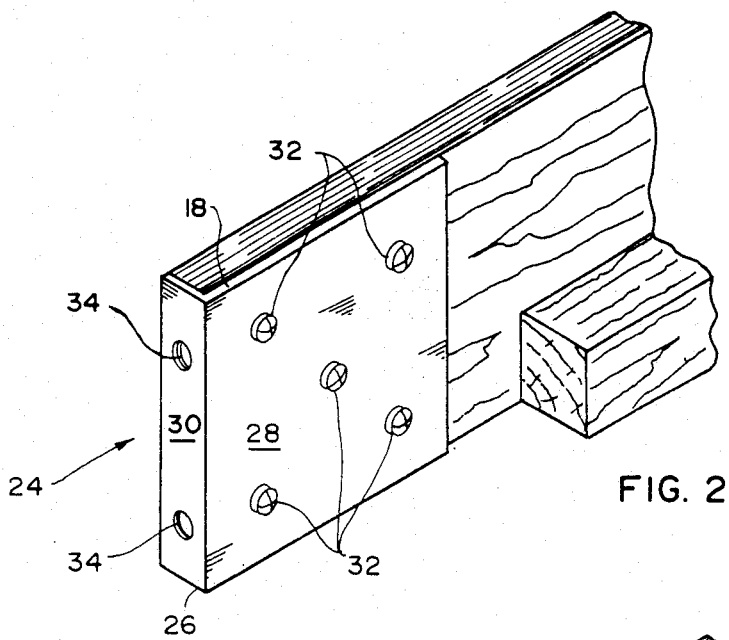
FIG. 2 is a perspective, enlarged, and fragmentary view of the bracket comprising the present invention affixed to a side rail.

The connections between the side rail ends 18 and headboard 12 and footboard 14 are facilitated by a bracket shown generally as 24 in FIG. 2. Bracket 24 is preferably made up of an L-shaped body portion 26 having a side section 28 and an end section 30. Body portion 26 is affixed to side rail end 18 by suitable means, preferably screws 32.

Figure 3:
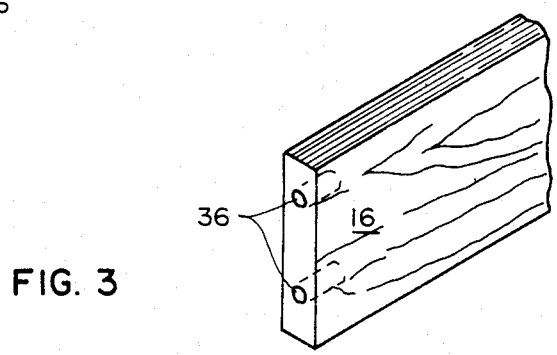
FIG. 3 is a perspective fragmentary view of a side rail end adapted to receive the bracket comprising the present invention.

End section 30 of body portion 26 is provided with threaded apertures 34 positioned to align with drilled cavities 36 in the side rail end portions 18 such as shown in FIG. 3.

Bracket 24 is utilized to connect headboard 12 and footboard 14 to side rail ends 18 as shown in FIG. 1. Suitable apertures (not shown) are provided in headboard 12 and footboard 14 to align with threaded recess 34 and drilled cavities 36 in bracket 24 and side rail end 18 respectively. Screws 38 are used to extend through the apertures in headboard 12 and footboard 14 cooperatively engaging threaded recess 34 and extending into drilled cavities 36.

The presence of the threaded apertures 34 in the end section 30 of bracket 24 and the L-shaped configuration of bracket 24 so that it is firmly affixed on side section 28 to side rail end 18 provides strength and rigidity for the connection. It is unlikely to work loose even if the bed is used continuously over an extended period of time.

The principle of this invention may be applied to cots, day beds, sofas, doll cradles and to other articles, and the term "bed" is to be given the broadest interpretation consistent with the prior art.

While the preferred form of this invention has been shown and described, it will be understood that the invention is not restricted to the particular details of construction and arrangements herein set forth, but that changes in such details and constructions may be made within the scope of what is hereinafter claimed without departing from the spirit hereof.

What is claimed is:

1. A bracket for attaching a side rail to a headboard and a footboard, the side rail having screw-receiving cavities therein, said bracket comprising: an L-shaped body portion having a side section and an end section, each of said sections having an inner and outer surface; means releasably securing said inner surface of said side section to the side rail; threaded means within said body portion end section cooperatively aligned with the side rail cavities; and screw means extending through at least the headboard and threadably engaging said end section threaded means to hold at least the headboard securely against said body portion end section inner surface and said side section inner surface.

2. The bracket of claim 1 wherein said releasably securing means are a plurality of screws.

3. The bracket of claim 2 wherein said threaded means is a drilled and tapped screw receiving opening in said body portion end section.

4. The bracket of claim 1 wherein said screw means is at least one threaded bolt operable to threadably engage said threaded means and extend into the screw-receiving cavity.

5. A bed having two side rails with screw-receiving cavities therein, a headboard, a footboard, and four L-shaped brackets cooperatively securing said side rails to said headboard and said footboard, each of said brackets having an L-shaped body portion having a side section and an end section, each of said sections having an inner and outer surface; means releasably securing said inner surface of said side section to the side rail; threaded means within said body end section cooperatively aligned with the side rail cavities; and screw means extending through at least the headboard and threadably engaging said end section threaded means to hold at least the headboard securely against said body portion end section inner surface and said side section inner surface.

6. The bed as claimed in claim 5 wherein said releasably securing means are a plurality of screws.

7. The bed as claimed in claim 6 wherein said threaded means is a drilled end tapped screw receiving opening in said body portion end section.

8. The bed as claimed in claim 5 wherein said screw means is at least one threaded bolt operable to threadably engage said threaded means and extend into the screw-receiving cavity.

* * * * *